Oct. 16, 1956  A. BRUEDER  2,767,334
ELECTROSTATIC GENERATORS
Filed April 14, 1955  2 Sheets-Sheet 1

Oct. 16, 1956 A. BRUEDER 2,767,334
ELECTROSTATIC GENERATORS
Filed April 14, 1955 2 Sheets-Sheet 2

United States Patent Office 2,767,334
Patented Oct. 16, 1956

2,767,334

ELECTROSTATIC GENERATORS

Antoine Brueder, Paris, France, assignor to Societe Anonyme Andre Citroen, Paris, France, a corporation of France Application April 14, 1955, Serial No. 501,407

Claims priority, application France April 16, 1954

13 Claims. (Cl. 310—6)

The invention relates to an electrostatic device adapted to be used as a potential generator and which is especially applicable to the ignition systems of explosion engines.

In accordance with the invention, the electrostatic device comprises a rotor and a stator, the stator being disposed within the interior of the rotor and being held stationary by magnetic means. This arrangement enables a difference of pressure to be maintained between the interior and the exterior of the rotor, for example by the provision of a compressed gas within the interior of the rotor, without the necessity of providing fluid-tight rotating joints.

The present invention has more particularly for its object an electrostatic device in which the rotor is constituted by a fluid-tight closed chamber, inside which the stator is pivotally-mounted, and is held stationary by the action of a magnetic field in an atmosphere of compressed gas.

In accordance with one particular form of embodiment, the stator is constituted by two portions in the shape of a U, the limbs of which are directed in opposite senses, and are made of magnetic alloy, insulated from each other and arranged in such manner as to have potentials of opposite polarity, these members being adapted to act on armatures carried on the internal surface of the rotor, and which each communicate with external conducting elements.

In accordance with a further special feature of the invention, contacts are provided on the exterior of the rotor in front of which contacts conducting members pass, these contacts being provided with suitable connections so as to ensure the necessary commutation action. There is also provided a rotary distributor which receives the charges formed on the armatures and transmits them to the ignition circuit, this distributor being preferably driven at the same speed as the rotor of the generator, and in the opposite direction.

An electrostatic generator in accordance with the invention will now be described, by way of example only, reference being made to the attached drawings in which.

Figure 1:
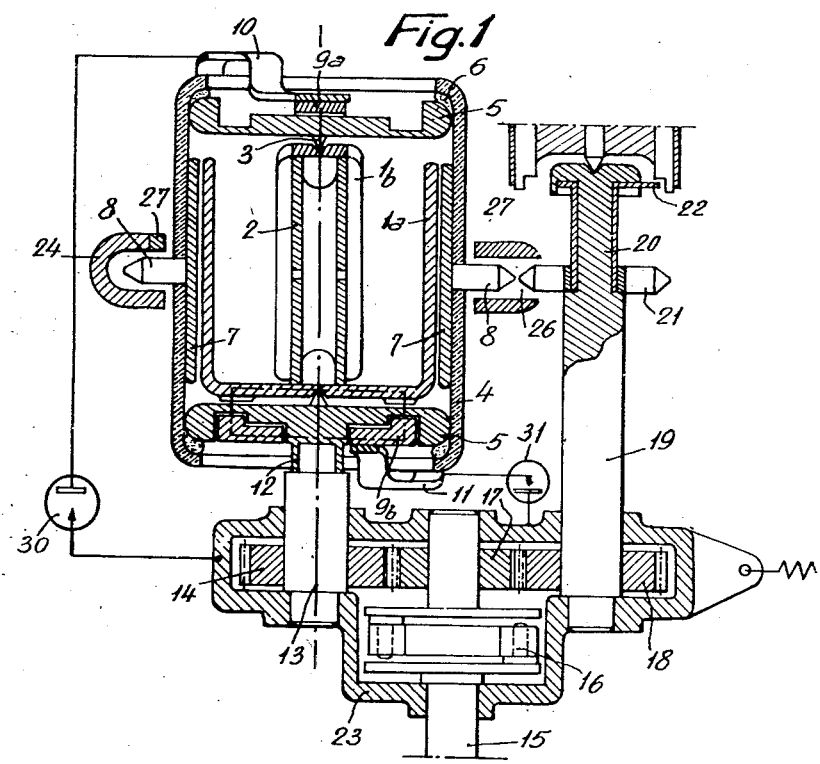
Fig. 1 shows the general arrangement of the device in cross-section elevation.
Figure 2:
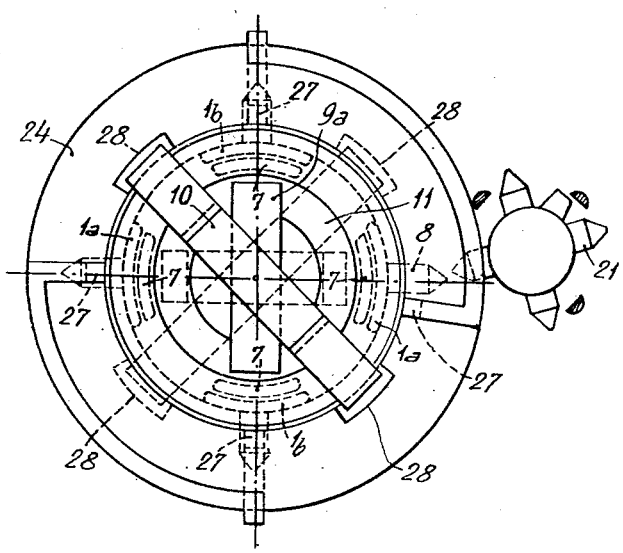
Fig. 2 is a corresponding plan view.

Referring to the drawings, it will be seen that the generator is constituted by a stator 1 mounted in a fluid-tight manner within the interior of a rotor 4, by a fixed ring 24 carrying commutation contacts and surrounding the rotor, and by a rotary distributor 20, by means of which the electric charges are supplied to an ignition system, for example to the spark plugs of an explosion engine.

The stator 1 is composed of two ferro-magnetic metallic members 1a, 1b, in the shape of a U, arranged at right angles to each other, the transverse parts of these members being respectively mounted at each extremity of an insulating spindle 2. This stator is supported by pivot bearings 3 within the interior of the fluid-tight rotor; the latter is formed by a cylindrical casing 4 of insulating material, the opposite ends of which are closed by circular plates 5 of non-magnetic metal, with the interposition of a suitable material forming a joint 6.

The casing carries on its internal face insulated metallic members or armatures 7, which are four in number and are arranged diametrically-opposite each other in two directions at right angles; each armature is associated with a cylindrical contact finger 8 which passes through the wall so as to co-operate with external contacts.

Above the discs 5 are arranged fixed pole-pieces 9a, 9b, constituted by permanent magnets or electro-magnets, each of which is parallel to the transverse part of the nearest element 1a or 1b, through which is completed the magnetic circuit produced by the corresponding pole-piece; these pieces are respectively carried by conducting members 10 and 11 having a wide cross-section.

One of the discs 5 is extended towards the exterior of the casing by an axial tubular member 12 mounted at the extremity of a shaft end 13. The latter carries a pinion 14 which forms part of a transmission unit contained in an orientatable casing 23 acting as a support.

The motion of a driving shaft 15 is transmitted through the medium of a centrifugal driving device 16 to the pinion 17 which engages on the one hand the pinion 14, thus driving the rotor, and on the other hand, a pinion 18 which drives a distributor 20 through the intermediary of a shaft 19, the distributor being provided with four fingers 21, diametrically-opposite in two directions at right angles and connected by a conductor with a rotating contact 22 to the utilisation circuit.

The casing assembly 23 is variable in position around the shaft 13 so as to permit of adjustment of the instant at which the fingers 8 and 21 will coincide.

The casing 4 of the rotor is surrounded by a ring 24 which is fixed and is of insulating material, curved in towards the rotor, and into which pass the fingers 8 to co-operate with contacts mounted on the interior of this ring 24; the latter is also provided with a window 26 on the exterior side in which appear the fingers 21 of the distributor.

Figure 3:
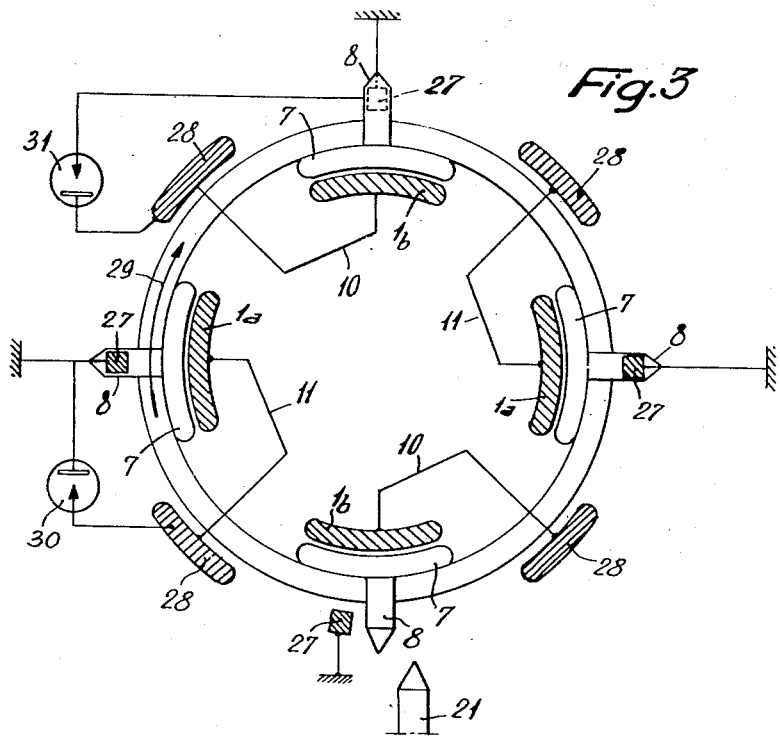
Fig. 3 is a diagrammatic view of the arrangement of the rotor and stator.

Fig. 3 shows in a diagrammatic form the different contacts carried by the ring and their arrangement with respect to the stator and to the rotor: these are, on the one hand the contacts 27, each of which is respectively arranged in the axis of the members 1a and 1b of the stator (with the exception of that situated at the side of the distributor, which is slightly displaced forwards) and connected to ground in any suitable manner and, on the other hand, the contacts 28, of elongated form, arranged between the contacts 27 and each extending over an angular segment of about 45° and which are also separated from contacts 27 by a segment of about 45°. The contacts 28 are electrically connected to the members of the stator, each contact being joined to that member of the stator which follows it in the direction of rotation of the rotor which has been indicated here by the arrow 29. This connection is carried out through the medium of the conductors 10 and 11 previously referred to, which are respectively coupled to the members 9a, 9b, and the pivots 3 of the stator. Voltage-limiting devices 30, 31 are arranged between the conductors 10 and 11 and ground, in order that the potentials of these members do not exceed the rated value set for properly maintaining the apparatus in good working condition.

Figure 4:
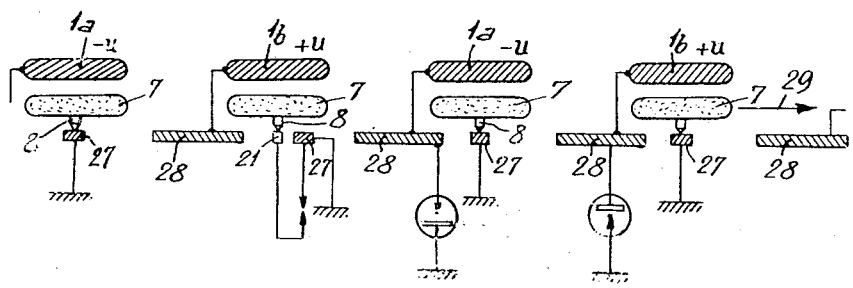
Fig. 4 is a developed view of the contact assembly.

The method of operation will be described by reference to the diagram of Fig. 4 which shows the various contacts in alignment. It will be supposed that there has been established a difference of potential between the members 1a and 1b, such that 1b is at a potential $+u$ and 1a at a potential $-u$, the armatures 7 then forming with each of these members a capacity which varies with the rotation of the rotor.

If it is assumed that one of the armatures 7 is directly above one of the members 1a (for example, that on the right-hand side of Fig. 4), the finger 8 is in electrical contact with the corresponding contact 27 connected to ground; at that instant the capacity formed by the oppositely-situated members 1a and 7 is a maximum, and the charge will then be $q=cU$, the potential U of the rotor being positive with respect to the stator. As the movement of rotation continues, this capacity falls, the potential U of 7 increases and at a given moment becomes greater than $+u$; at that moment, the armature 7 comes into electric contact with the contact 28 which is connected to the member 1b having a potential $+u$, so that as the capacity continues to fall, the potential U continues to increase, the charges passing on to the member 1b, which maintains or increases the positive potential of the stator. This first period corresponds to a period of self-excitation.

The armature 7, as it continues its rotation, remains in electrical contact with the elongated contact 28 and is thus maintained at the same potential $+u$ as the member 1b of the stator. The capacity formed between these two members increases and the work effected is zero. In the zone of maximum capacity, when the armature 7 has arrived under the member 1b, the contact between the armature 7 and the contact 28 is broken, and at this moment the finger 8 passes in front of a finger 21 of the rotary distributor which connects this armature sharply to ground across the electrodes of the spark plug 32 and causes a spark to pass between these electrodes; the finger 8 then passes in front of the contact 27 which maintains the circuit connected to earth. The moving armature 7 being connected to ground is thus negative with respect to the member 1b of the stator. After the contact has been broken with the contact 27, the movement of the armature 7 continues and the capacity falls so that the potential of the armature 7 becomes more and more negative until it becomes slightly more negative than $-u$; the next elongated contact 28 puts the armature in connection with the following member of the stator which is at a potential $-u$, so that this potential tends to increase within the limits imposed by the potential regulator. The armature 7 and the member 1a being at the same potential $-u$, the capacity of the combination increases by reason of the rotation of the armature. The latter being rotated at this point without the necessity of overcoming the magnetic resistance forces. The rotational force at this moment overcoming only mechanical friction of the device.

In the zone of maximum capacity, when the armature 7 has arrived opposite the member 1a, the contact with the elongated contact 28 is broken, and a connection is then established with the ground contact 27; the armature then becomes positively charged with respect to the member 1a and the cycle continues.

The connection between the armature 7 of the rotor and the contacts 28 is made without producing any spark, at the moment at which the capacity has reached a value $$\frac{c \max}{2}$$

the capacity of the unit then falls away and the final potential increases to a fixed value, whatever the point of connection may be, negative or positive.

If the capacity varied by a total amount of $cm$ to $$\frac{cm}{2}$$

the amplifying power would be equal to 1 and the self-excitation effect would be impossible; it is thus essential that the minimum capacity should be lower than $$\frac{cm}{2}$$

the operation then being made possible and the potential being limited by the insulation resistance and the potential-limiting device.

I claim:

1. In an electrostatic generator in combination, a rotor comprising a rotatable fluid-tight casing, a plurality of selectively positioned armature-plates carried by said rotor and disposed inside said casing, a plurality of armature-plate contacts connected each to one of said armature-plates and extending out through said casing, a stator pivotally mounted in said casing, means to hold said stator stationary, a plurality of contacts mounted stationary and external of said casing, electrical connection means between said stator and said externally mounted contacts to provide electrical connection and to maintain said contacts in stationary position, a plurality of stationary intermittent discharge means to intermittently discharge electrostatic charges in said armature-plates, means to rotate said casing whereby when said casing is rotated each of said armature-plate contacts first make intermittent connection with one each of said intermittent discharge means and sequentially with one each of said externally mounted contacts successively and being in connection with each of said externally mounted contacts a greater period of time than with each of said intermittent discharge means.

2. An electrostatic generator in accordance with claim 1, in which said generator is filled with a gas having a pressure of at least one atmosphere.

3. An electrostatic generator in accordance with claim 1, in which said means to hold said stator stationary comprises a magnetic field.

4. An electrostatic generator in accordance with claim 1, in which said stator comprises at least two U-shaped members disposed in different planes and at right angles to one another having the same axial mount with the arms of each U extending toward the arms of the other.

5. An electrostatic generator in accordance with claim 1, in which said fluid-tight casing includes non-magnetic metallic discs sealing the ends of the casing.

6. An electrostatic generator in accordance with claim 1, in which said means to rotate said rotor includes a discharge distributor.

7. An electrostatic generator in accordance with claim 6, in which said distributor is external of said casing and said means to rotate said casing further includes driving members to drive said casing and said distributor at the same speed and in opposite directions.

8. An electrostatic generator in accordance with claim 1, in which said generator further includes a plurality of magnetic members selectively positioned with respect to said stator.

9. An electrostatic device for generating electric potentials, comprising a stator, said stator comprising two U-shaped members spaced from one another, a rotor comprising a tubular casing of insulating material, non-magnetic metallic discs closing the ends of said tubular casing with fluid-tight joints, pivots carried by said discs forming the pivoted mounting for said stator inside said rotor, at least two pole-pieces of magnetic material associated with the outer faces of said pivot-carrying discs, each of said pole-pieces being mounted parallel to the transverse portion of a corresponding U-shaped member of the stator, a plurality of longitudinal, diametrically opposed armature-plates fixed on the internal face of the casing, a finger fixed on each armature-plate and arranged to extend out through said casing, means for rotatably driving said rotor and means for preventing rotation of said stator during rotation of said rotor.

10. An electrostatic device for generating electric potentials, comprising a stator, a rotor constituted by a tubular casing of insulating material, a pair of nonmagnetic metallic discs for closing the extremities of said casing with fluid-tight joints, magnetic pole-pieces associated with the outer faces of said discs, a plurality of longitudinal, diametrically-opposite armature-plates on the internal face of said casing, a finger fixed on each said armature and adapted to pass through said casing, a U-section ring of insulating material disposed around the exterior of said casing with its opening towards the outer face thereof, a plurality of contact-plates on said ring, means for connecting at least one of said contact-plates to earth and means for connecting the remaining contact-plates to said pole-pieces, means for pivotally-mounting said stator inside said rotor, means for rotatably driving said rotor, and magnetic means for preventing rotation of said stator during rotation of said rotor.

11. A device as claimed in claim 10, and further comprising a rotary distributor and an orifice formed in the said U-section ring, through which orifice pass the fingers of the said distributor.

12. A device as claimed in claim 10, and further comprising a rotary distributor and a common driving member adapted to drive the rotor of the said device and the said distributor at the same speed and in opposite directions.

13. A device as claimed in claim 12, and further comprising means for varying the position of the said rotary distributor with respect to the said rotor.

References Cited in the file of this patent
UNITED STATES PATENTS

| | | |
|---|---|---|
| 2,590,168 | Felici | Mar. 25, 1952 |
| 2,685,654 | Mennesson | Aug. 3, 1954 |